US009326208B2

(12) United States Patent
Salkintzis (10) Patent No.: US 9,326,208 B2
(45) Date of Patent: Apr. 26, 2016

(54) METHOD AND APPARATUS FOR DETERMINING WHEN TO HANDOVER COMMUNICATIONS FROM A FIRST TO A SECOND ACCESS NETWORK

(71) Applicant: Google Technology Holdings LLC, Mountain View, CA (US)

(72) Inventor: Apostolis K. Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 168 days.

(21) Appl. No.: 14/151,849

(22) Filed: Jan. 10, 2014

(65) Prior Publication Data

US 2015/0172986 A1  Jun. 18, 2015

Related U.S. Application Data (60) Provisional application No. 61/916,817, filed on Dec. 17, 2013.

(51) Int. Cl.
*H04W 36/22* (2009.01)
*H04W 36/14* (2009.01)
*H04W 36/36* (2009.01)
*H04W 36/30* (2009.01)

(52) U.S. Cl.
CPC ............. *H04W 36/22* (2013.01); *H04W 36/14* (2013.01); *H04W 36/36* (2013.01); *H04W 36/30* (2013.01)

(58) Field of Classification Search
CPC ..... H04W 36/22; H04W 36/14; H04W 36/36; H04W 36/30
USPC .......................................................... 455/436
See application file for complete search history.

(56) References Cited

U.S. PATENT DOCUMENTS

| 2007/0104166 | A1 | 5/2007 | Rahman et al. | |
|---|---|---|---|---|
| 2007/0104218 | A1 | 5/2007 | Hassan et al. | |
| 2008/0102815 | A1* | 5/2008 | Sengupta | H04W 36/24 455/424 |
| 2009/0046665 | A1* | 2/2009 | Robson | H04W 36/04 370/332 |
| 2009/0116447 | A1* | 5/2009 | Balasubramanian | H04W 36/14 370/331 |
| 2011/0183671 | A1 | 7/2011 | Lee et al. | |

(Continued)

OTHER PUBLICATIONS

3rd Generation Partnership Project; Technical Specification Group Services and System Aspects; IP flow mobility and seamless Wireless Local Area Network (WLAN) offload; Stage 2, 2012-12, 22 pages, 3GPP TS 23.261, Release 11, v11.0.0.

(Continued)

*Primary Examiner* — Barry Taylor
(74) *Attorney, Agent, or Firm* — Faegre Baker Daniels LLP (57) ABSTRACT

A wireless communication device performs a method for determining when to trigger a handover of a communication session from a first access network to a second access network. The method includes determining, for an active communication session, a set of outgoing traffic statistics for outgoing traffic sent by the wireless communication device using the first access network and determining, for the active communication session, a set of incoming traffic statistics for incoming traffic received by the wireless communication device using the first access network. The method further includes analyzing the incoming and outgoing traffic statistics and determining when to trigger a handover of the active communication session from the first access network to the second access network based on the analysis of the incoming and outgoing traffic statistics.

16 Claims, 9 Drawing Sheets

(56) References Cited

U.S. PATENT DOCUMENTS

2012/0315905 A1 12/2012 Zhu et al.
2014/0022932 A1* 1/2014 Park .................. H04W 36/14
                                                                                        370/253

OTHER PUBLICATIONS

3rd Generation Partnership Project; Technical Specification Group Services and System Aspects; Architecture enhancements for non-3GPP access, Dec. 2013, 288 pages, 3GPP TS 23.402, Release 12, v12.3.0.

R. Koodli and C. Perkins, "Mobile IPv4 Fast Handovers" Internet Engineering Task Force, Network Working Group, Request for Comments: 4988, Oct. 2007, 28 pages.

R. Koodli Ed., "Mobile IPv6 Fast Handovers" Internet Engineering Task Force, Network Working Group, Request for Comments: 5268, Jun. 2008, 48 pages.

Vetrivelan, P. Narayansamy, P., Smirt with Call Admission Control (CAC) Based Handover Decision for Seamless Mobility in Multi-Access 4G Heterogeneous Wireless Overlay Networks, http://www.iaeng.org/publication/IMECS2012/IMECS2012_pp408-413.pdf, Mar. 14-16, 2012, all pages.

Blaise Angoma, Mohammed Erradi, Yahya Benkaouz, Amine Berqia, Mohammed Charaf AKALYA1, A Vertical Handoff Implementation in a Real Testbed, https://www.google.com/url?sa=t&rct=j&q=&esrc=s&source=web&cd=2&cad=rja&uact=8&ved=0CDEQFjAB&url=http%3A%2F%2Fwww.mc-journal.org%2FDownload.aspx%3FID%3D5436&ei=5mheU8_SB87n8AX0qICQCQ&usg=AFQjCNGLSm-oRgTEX1_1m58EpA8Dheenbg&sig2=gbAOoMF_pzp55z-7t85S2g&bvm=bv, Nov. 1, 2012, all pages.

European Patent Office, International Search Report and Written Opinion for PCT Application No. PCT/US2014/070611, mailed Mar. 9, 2015.

* cited by examiner

METHOD AND APPARATUS FOR DETERMINING WHEN TO HANDOVER COMMUNICATIONS FROM A FIRST TO A SECOND ACCESS NETWORK

RELATED APPLICATIONS

The present application is related to and claims benefit under 35 U.S.C. §119(e) from U.S. Provisional Patent Application Ser. No. 61/916,817, filed Dec. 17, 2013, titled "METHOD AND APPARATUS FOR DETERMINING WHEN TO HANDOVER COMMUNICATIONS FROM A FIRST TO A SECOND ACCESS NETWORK", commonly owned with this application by Motorola, Inc., the entire contents of which is incorporated herein by reference.

FIELD OF THE DISCLOSURE

The present disclosure relates generally to wireless communications and more particularly to a method and apparatus for determining when to handover an active communication session from one wireless access network to another wireless access network.

BACKGROUND

As it becomes more and more common for wireless communication devices to implement multiple wireless access technologies, wireless network operators are beginning to deploy different wireless access networks, also referred to in the art as radio access networks (RANs), which share a same core network. For example, some operators of networks that implement one or more $3^{rd}$ Generation Partnership Project (3GPP) standards, such as Long Term Evolution (LTE) networks, are planning to integrate WiFi networks into their existing cellular network infrastructure. Such WiFi networks are termed in the standards as "trusted" WiFi networks.

One of the key motivations for 3GPP operators to deploy trusted WiFi networks is to offer operator-hosted Internet Protocol (IP) services and, most notably, IP Multimedia Core Network Subsystem (IMS) voice services over WiFi access, i.e., voice-over-WiFi. To efficiently support voice-over-WiFi, it is important to support handover of voice sessions or calls from the WiFi access network to the cellular access network. For this purpose, the architecture specified by 3GPP for trusted WiFi integration supports "IP address preservation" between WiFi and cellular access networks. IP address preservation enables the wireless communication devices, referred to as user equipment (UE) in the 3GPP standards, to maintain the same IP address when switching an active communication session, such as a voice call, between the WiFi and cellular access networks.

However, simply maintaining the same IP address is insufficient to provide the voice handover performance expected by some users. More particularly, a voice interruption or break that results from the access network change should also be minimized. This is very challenging for UEs that have wireless transceiver equipment that can communicate over both WiFi and cellular access networks but not simultaneously. The voice interruption, for example, for such UEs during handover of an active voice call from the WiFi access network to the cellular access network can oftentimes be greater than ten seconds.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, are methods and a communication device configured for determining when to trigger a handover of an active communication session. In accordance with one embodiment is a method for determining when to trigger a handover of a communication session from a first access network to a second access network. The method includes determining, for an active communication session, a set of outgoing traffic statistics for outgoing traffic sent by the wireless communication device using the first access network and determining, for the active communication session, a set of incoming traffic statistics for incoming traffic received by the wireless communication device using the first access network. The method further includes analyzing the incoming and outgoing traffic statistics and determining when to trigger a handover of the active communication session from the first access network to the second access network based on the analysis of the incoming and outgoing traffic statistics.

In accordance with another embodiment is a wireless communication device configured to determine when to trigger a handover of a communication session from a first access network to a second access network. The wireless communication device includes a wireless radio coupled to a traffic analysis module. The wireless radio is configured to transmit outgoing traffic and to receive incoming traffic communicated, using the first access network, during an active communication session. The traffic analysis module is configured to: determine, for the active communication session, a set of outgoing traffic statistics for the outgoing traffic; determine, for the active communication session, a set of incoming traffic statistics for the incoming traffic; analyze the incoming and outgoing traffic statistics; and determine when to trigger a handover of the active communication session from the first access network to the second access network based on the analysis of the incoming and outgoing traffic statistics.

In accordance with yet another embodiment is another method for determining when to trigger a handover of a communication session from a first access network to a second access network. This method includes determining, for an active communication session, a set of outgoing traffic statistics for outgoing traffic sent by the wireless communication device using the first access network and receiving incoming traffic using the first access network. The method also includes determining and analyzing a signal strength associated with the received incoming traffic. The method further includes: determining, for the active communication session, a set of incoming traffic statistics for the incoming traffic; analyzing the incoming and outgoing traffic statistics; and determining when to trigger a handover of the active communication session from the first access network to the second access network based on the analysis of the incoming and outgoing traffic statistics and based on the analysis of the signal strength.

In accordance with embodiments of the present teachings, a wireless communication device can initiate or trigger a handover from one access network to another access network to enable a reduced disruption in communications and an enhanced user experience. In addition, the present teachings do not require changes to the infrastructure or any new interfaces to be implemented in a core network that supports both access networks. Instead, the present teachings can be implemented from the wireless communication device side and can be implemented irrespective of the wireless access technology used. Moreover, the present teachings are more easily, efficiently, and/or cost effectively implemented that other methods for handover such as: configuring the wireless communication device to simultaneously support packet data communication over multiple radios, which requires major changes to the operating system (OS) and also requires the support of policy-based IP routing and enforcement of IP policy rules by the infrastructure; pro-active link layer triggers that can be unreliable; forward handovers, which are not easily applicable in some scenarios such as for WiFi to cellular handovers; etc.

Figure 1:
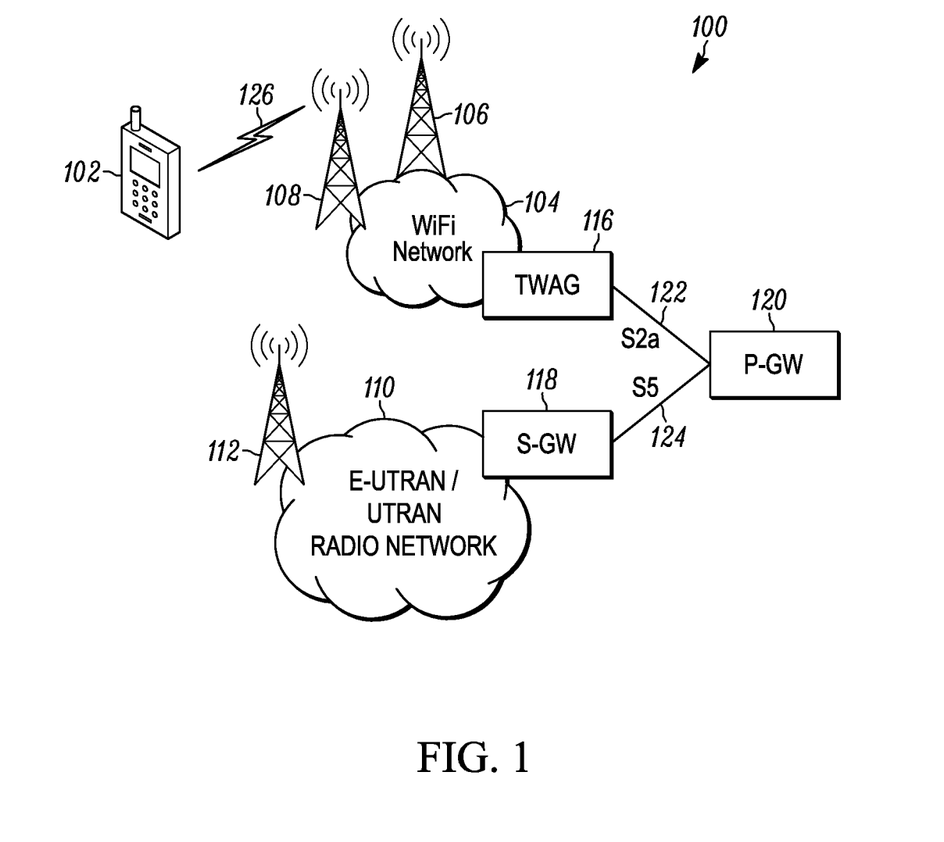
FIG. 1 is a schematic diagram illustrating a wireless communication environment in which at least one communication device is configurable in accordance with some embodiments.

Turning now to FIG. 1, illustrated therein is a schematic diagram of an example environment 100 within which may be implemented methods and devices for determining when to trigger a handover of a communication session from a first access network to a second access network, in accordance with the present teachings, wherein an access network is also referred to herein as a wireless access network. In this particular embodiment, a wireless communication device 102, which in this example is a mobile or portable device, is configured for establishing wireless connections to infrastructure equipment within multiple access networks, e.g., access network 104 and access network 110, to, for instance, exchange data and voice communications with other mobile or portable devices. The two access networks 104 and 110 can use any type of access technology for a wireless communication device to access and communicate using the access network; but in one embodiment, two different access technologies are used to respectively access the two access networks 104 and 110. Access technologies are also referred to herein as wireless access technologies and also known in the art as radio access technologies (RATs).

In this illustrative embodiment, the access network 104, also referred to herein as a first access network, is a Wireless Local Area Network (WLAN) having at least one access point, e.g., 106, 108, for facilitating wireless connections using Institute of Electrical and Electronics Engineers (IEEE) 802.11 standards, also referred to in the art as WiFi technology. Thus, access network 104 is also referred to herein as a WiFi network or a WiFi access network. However, any other type of wireless access technology such as Worldwide Interoperability for Microwave Access (WiMax) or a cellular or cellular-based access technology may be implemented in the network 104.

The access network 110, also referred to herein as a second access network, is a cellular access network, also referred to herein as a cellular network, having at least one cellular tower or base station, e.g., 112, for facilitating wireless connections to the access network 110. As shown, the cellular network 110 and a core network that supports communications using the cellular network 110 is implemented using 3GPP standards, for example as an LTE network. More particularly, the cellular network 110 is an Evolved UMTS Terrestrial Radio Access Network (E-UTRAN) or a legacy UTRAN having at least one EnodeB, e.g., 112, for facilitating wireless connections to UE such as the wireless communication device 102.

In an embodiment, the cellular access network 110 uses E-UTRA as the RAT. However, any other cellular or cellular-based access technology can be used including, but not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), IEEE 802.16, etc., or variants thereof.

The core network that supports and interconnects the WiFi network 104 and the cellular network 110 is, in this embodiment, a System Architecture Evolution (SAE) core, also referred to in the art as an Evolved Packet Core (EPC). The EPC subcomponents can include, among other subcomponents, a Mobility Management Entity (MME) not shown, a Serving Gateway (S-GW) 118, a PDN Gateway (P-GW) 120, a Home Subscriber Server (HSS) not shown, an Access Network Discovery and Selection Function (ANDSF) not shown, and an Evolved Packet Data Gateway (ePDG) not shown. The cellular network 110 interfaces to the EPC using an S5 interface 124 between the P-GW 120 and the S-GW 118. In the present embodiment, the WiFi network 104 is implemented as a trusted WiFi network and, therefore, includes a Trusted WiFi Access Gateway (TWAG) 116. The WiFi network 104 interfaces to the EPC using an S2a interface 122 between the P-GW 120 and the TWAG 116. The interfaces and network elements shown in FIG. 1 are well known and are specified in 3GPP specifications.

As shown, the wireless communication device 102 has a wireless connection or link 126 to the access point 108 in the WiFi network 104. The link 126 is used to support an active communication session in order to communicate data such as video and/or voice using the WiFi network 104. In accordance with the teachings herein, methods can be performed by the wireless communication device 102 for determining when to trigger a handover, also sometimes called a failover in the art, from the WiFi network 104 to the cellular network 110.

Figure 2:
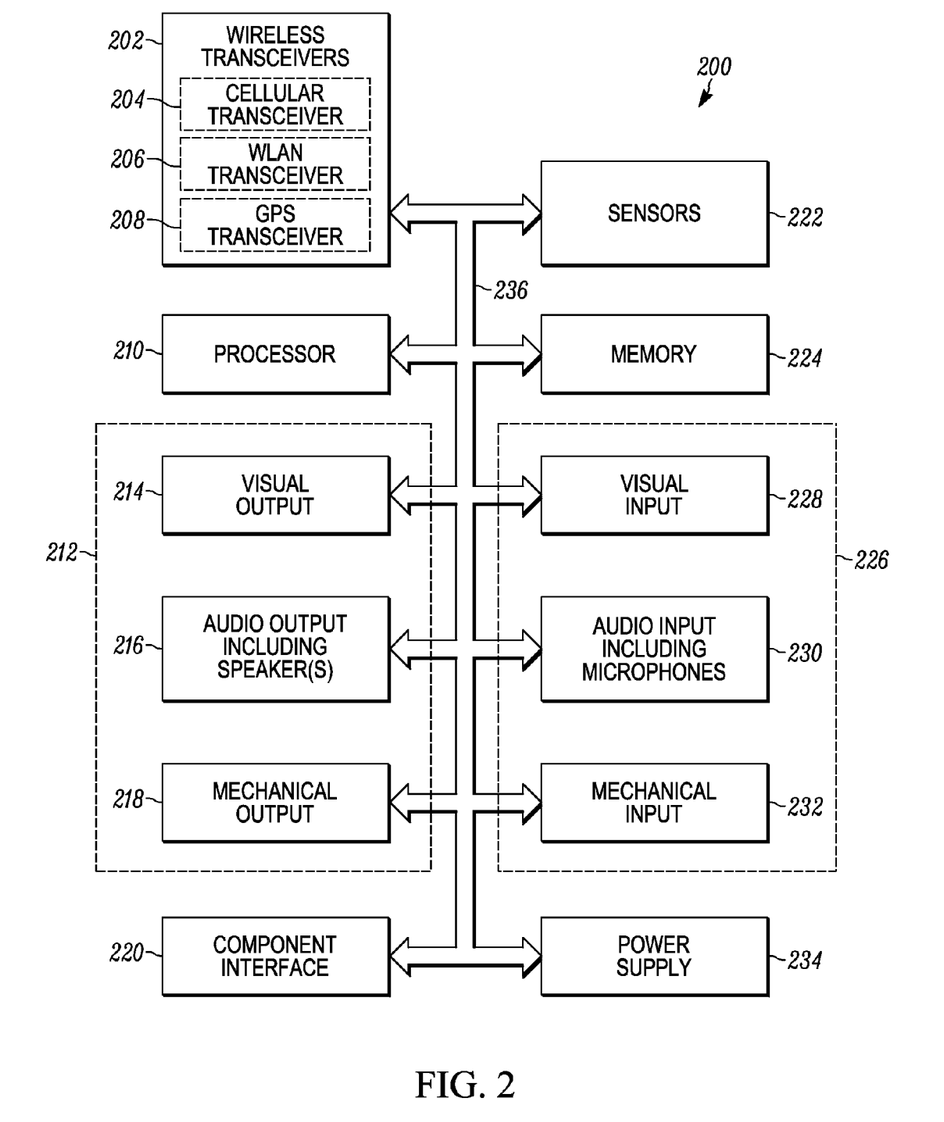
FIG. 2 is a block diagram illustrating internal components of a wireless communication device configured in accordance with some embodiments.

Referring now to FIG. 2, there is provided a block diagram illustrating example internal components 200 of the wireless communication device 102 of FIG. 1, in accordance with the present embodiment. The wireless communication device 102 is intended to be representative of a variety of mobile devices including, for example, cellular telephones, personal digital assistants (PDAs), smart phones, laptop computers, tablets, phablets, or other handheld or portable electronic devices. As shown in FIG. 2, the internal hardware elements or components 200 include one or more transceivers 202, one or more processors 210, output components 212, a component interface 220, one or more sensors 222, a memory component 224, input components 226, and a power supply 234. As further illustrated, the internal components 200 are coupled to one another, and in communication with one another, by way of one or more internal communication links 236, for instance an internal bus. A limited number of device components 202, 210, 212, 220, 222, 224, 226, and 234 are shown at 200 for ease of illustration, but other embodiments may include a lesser or greater number of such components in a device, such as device 102. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processor 210 and wireless transceivers 202 (particularly a cellular transceiver 204 and a WLAN transceiver 206) are configured with functionality in accordance with embodiments of the present disclosure as described in detail below with respect to the remaining FIGS. 3-11. "Adapted," "operative," "capable" or "configured," as used herein, means that the indicated components are implemented using one or more hardware elements, which may or may not be programmed with software and/or firmware as the means for the indicated components to implement their desired functionality. Such functionality is supported by the other hardware shown in FIG. 2, including the device components 212, 220, 222, 224, 226, and/or 234.

Continuing with the brief description of the device components shown at 200, as included within the device 102, the wireless transceivers 202 include the cellular transceiver 204, the WLAN transceiver 206, and a Global Positioning System (GPS) transceiver 208. More particularly, the cellular transceiver 204 is configured to implement any suitable cellular or cellular-based technology to conduct cellular communications of data over a cellular network, such as the cellular network 110. The WLAN transceiver 206 is a WiFi transceiver 206 configured to conduct WiFi communications over a WiFi network, such as the WiFi network 104, in accordance with the IEEE 802.11 (a, b, g, or n) standard. In a particular embodiment, the cellular transceiver 204 and WLAN transceiver 206 are configured for alternate operation to support wireless communications over the access networks 110 and 104, respectively. This means that the device 102 can operate only one of the transceivers 204 or 206 at a time to send and receive data over a wireless access network, but not simultaneously.

In an alternative the component 202 is a shared wireless transceiver that is configured for communicating using multiple assess technologies but not at the same time. Accordingly, in this embodiment, the communication device 102 uses the shared wireless transceiver 202 to transmit outgoing traffic and to receive incoming traffic communicated, using both a first access network and a second access network. In a particular embodiment, the transceiver 202 operates as a cellular transceiver when it implements a cellular or cellular-based access technology to communicate over a cellular network such as the cellular network 110. The transceiver 202 further operates as a WLAN transceiver when it implements a WLAN access technology to communicate over a WLAN network such as the WiFi network 104. The GPS transceiver 208 enables the determination of the geographic location of the device 102.

The processor 210 includes arithmetic logic and registers necessary to perform the digital processing required by the device 102 to, for example, determine when to trigger a handover of an active communication session from a first access network such as the WiFi network 104 to a second access network such as the cellular network 110 in a manner consistent with the embodiments described herein. For one embodiment, the processor 210 represents a primary microprocessor or central processing unit (CPU) of the device 102 such as an application processor of a smartphone 102. In another embodiment, the processor 210 is baseband processor or other ancillary or standalone processor to the CPU that is used by one or more of the wireless transceivers 202 to provide the processing capability, in whole or in part, needed for the device 102 to perform its intended functionality in accordance with the present teachings, for instance by reference to the flow diagrams shown in FIGS. 4-6. Depending at least in part on the particular function being performed and a given device 102 design, various functionality or protocols may be executed by the processor 210 in hardware or as software or firmware code.

In the embodiment shown, the output components 212 include: one or more visual output components 214 such as a liquid crystal display and/or light emitting diode indicator; one or more audio output components 216 such as a speaker, alarm, and/or buzzer; and one or more mechanical output components 218 such as a vibrating mechanism. Similarly, the input components 226 include one or more visual input components 228 such as a camera lens and photosensor; one or more acoustic receiver or audio input components 230 such as one or more transducers (e.g., microphones), including for example a microphone array and beamformer arrangement or a microphone of a Bluetooth headset; and one or more mechanical input components 232 such as a touchscreen display, a flip sensor, keyboard, keypad selection button, and/or switch.

As mentioned above, this embodiment of internal components 200 also includes one or more of various types of sensors 222 as well as a sensor hub to manage one or more functions of the sensors. The sensors 222 include, for example, proximity sensors (e.g., a light detecting sensor, an ultrasound transceiver or an infrared transceiver), touch sensors, altitude sensors, an accelerometer, a tilt sensor, and a gyroscope, to name a few.

The memory component 224 encompasses, in some embodiments, one or more memory elements of any of a variety of forms, for example read-only memory, random access memory, static random access memory, dynamic random access memory, etc. In an embodiment, the processor 210 uses the memory component 224 to store and retrieve data. In some embodiments, the memory component 224 is integrated with the processor 210 into a single component such as on an integrated circuit. However, such a single component still usually has distinct portions/sections that perform the different processing and memory functions.

The data that is stored by the memory component 224 includes, but need not be limited to, operating systems, programs (applications, protocols, and other code), and informational data. Each operating system includes executable code that controls basic functions of the wireless communication device 102, such as interaction among the various components included among the internal components 200, communication with external devices via the wireless transceivers 202 and/or the component interface 220, and storage and retrieval of programs and data, to and from the memory component 224. As for programs, each program includes executable code that utilizes an operating system to provide more specific functionality, such as file system service and handling of protected and unprotected data stored in the memory component 224. Such programs include, among other things, programming for sending and receiving various data such as voice and/or video and for enabling the wireless communication device 102 to perform methods or processes such as described below by reference to FIGS. 3-11. Finally, with respect to informational data, this is non-executable code or information that an operating system or program references and/or manipulates, in one embodiment, for performing functions of the wireless communication device 102.

In an embodiment, the component interface 220 provides a direct connection to auxiliary components such as a docking station or printer or accessories for additional or enhanced functionality. For example, the component interface can be implemented as one or more Universal Serial Bus (USB) ports, RS-232 or other serial connectors, etc. The power supply 234, such as a battery, provides power to the other internal components 200 while enabling the wireless communication device 102 to be portable.

Figure 3:
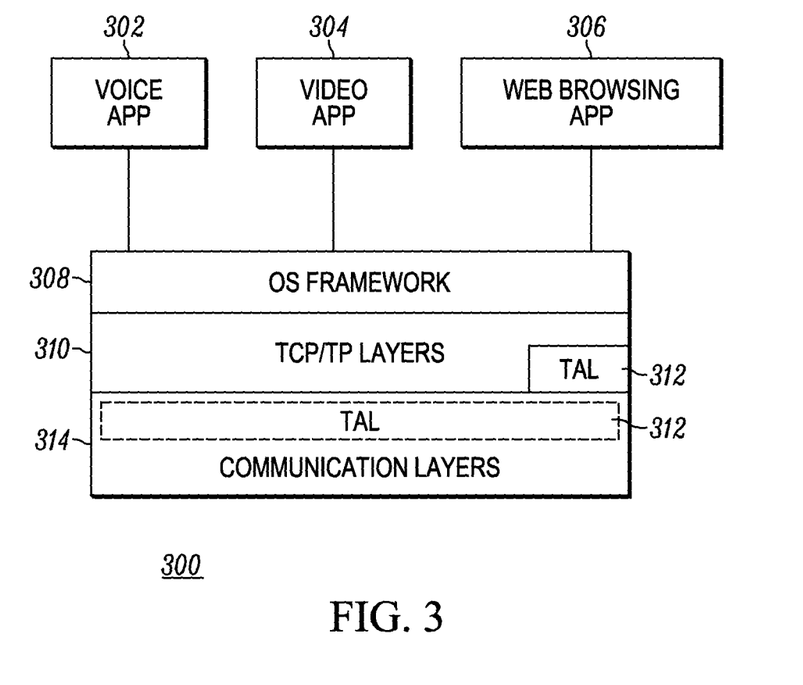
FIG. 3 is a block diagram illustrating functional aspects of a traffic analysis module within a wireless communication device configured in accordance with some embodiments.

FIG. 3 is a block diagram illustrating functional aspects of a traffic analysis module within a wireless communication device, such as the device 102 of FIG. 1, configured in accordance with some embodiments. In an embodiment, a traffic analysis module is implemented by a processor, e.g., the processor 210, which executes a traffic analysis procedure, also referred to herein as a traffic analysis protocol, within a traffic analysis layer (TAL), e.g., 312, of a protocol suite, e.g., 300, in order to perform functionality in accordance with the present teachings. The traffic analysis module is coupled to the wireless transceivers 202, in one embodiment, through one or more protocols in the protocol stack 300, which operate to process traffic that is transmitted by the wireless transceivers 202 or received by the wireless transceivers 202. More particularly, FIG. 3 shows an example implementation of the protocol stack or protocol suite 300 having multiple "layers" that each have, include, contain, or implement one or more protocols that enable various functionality of the wireless communication device 102. The layers are coupled to or in communication with other layers as need to process outgoing traffic and incoming traffic. In one embodiment, the protocol stack is implemented in the processor 210 and uses information stored in the memory component 224.

The protocol stack 300 has four sections: (a) an applications section that contains various applications including but not limited to a voice application (app) 302, a video application 304, and a web browsing application 306; (b) an operating system (OS) framework section 308; (c) a transport section 310 with communication protocols such as a Transport Control Protocol (TCP) and an Internet Protocol (IP); and (d) a data link communication section 314. The applications 302, 304, and 306 initiate the establishment of an active communication session, e.g., a voice call by the voice application 302, a video session by the video application 304, or a web browsing session by the web browsing application 306. An active communication session occurs between specific points in time when the session is established and torn down using the requisite signaling to enable ongoing communication of traffic between two endpoints. The traffic can be in the form of data chunks referred to herein generally as packets. During an active communication session, the application generates outgoing traffic or packets which are processed by lower layers, e.g., 310 and 314, to send to a receiving endpoint and processes incoming traffic from a transmitting endpoint, which has already been processed by the lower layers. Accordingly, the voice application 302 processes voice traffic. The video application 304 processes video traffic, and the web browsing application 306 processes web browsing traffic (e.g. HTTP traffic).

The OS framework section 308 implements a set of functions that support the communication between the applications section and, at least, the transport section 310. This section enables the applications 302, 304, 306 to utilize the transport services provided by the transport section 310 and also to utilize other services provided by other sections in the mobile OS, not shown in FIG. 3. Such services may include location services, media rendering services, content encoding and presentation services, etc.

The TCP/IP section 310 includes a set of communication protocols, which include but are not limited to: Transmission Control Protocol, which can reside in a transport layer of the Open System Interconnection (OSI) computing model and is developed as a set of standards by the Internet Engineering Task Force (IETF) as described in a series of Requests for Comments (RFCs), e.g., RFC 675, RFC 793, RFC 1122, RFC 2581, and RFC 5681; and Internet Protocol, which can reside in the network layer of the OSI model and is developed as a set of standards by the IETF as described for instance in RFC 791 as IPv4. The TCP/IP section 310 provides end-to-end connectivity specifying how data should be formatted, addressed, transmitted, routed and received at the destination. The TCP/IP section 310 can be implemented by the main processor or by a stand-alone dedicated processor.

In an embodiment, the data link communication section 314 includes protocols contained in a data link layer and a physical layer, e.g., of the OSI computing model. The data link layer provides for error correction in the physical layer. The physical layer implements protocols to establish and terminate connections with another device such as an infrastructure device to communicate over a medium such as an access network. For wireless communications, the physical layer implements wireless access protocols and modulation techniques. In an embodiment, the communication section 314 is implemented in, at least, one baseband processor that interfaces with the transceivers 202.

The traffic analysis layer (TAL) 312 can be added to existing sections within the protocol stack 300 of the wireless communication device 102 or included as part of the initial protocol stack 300 programming of the device 102. In a particular embodiment, the traffic analysis layer is "hooked" onto the existing TCP/IP stack 310. This can be done, for example, using the well-known Netfilter hooks supported by the Linux kernel. Thus, in this embodiment, the traffic analysis layer 312 and corresponding traffic analysis procedure is an "add-on" component coupled to the TCP/IP layers 310 using e.g. Netfilter hooks to enable incoming and outgoing traffic analysis. In an alternative embodiment, the traffic analysis layer 312 and corresponding traffic analysis procedure is an integral part of the communication stack 314 or the TCP/IP stack and is not implemented as an "add-on" component.

Figure 4:
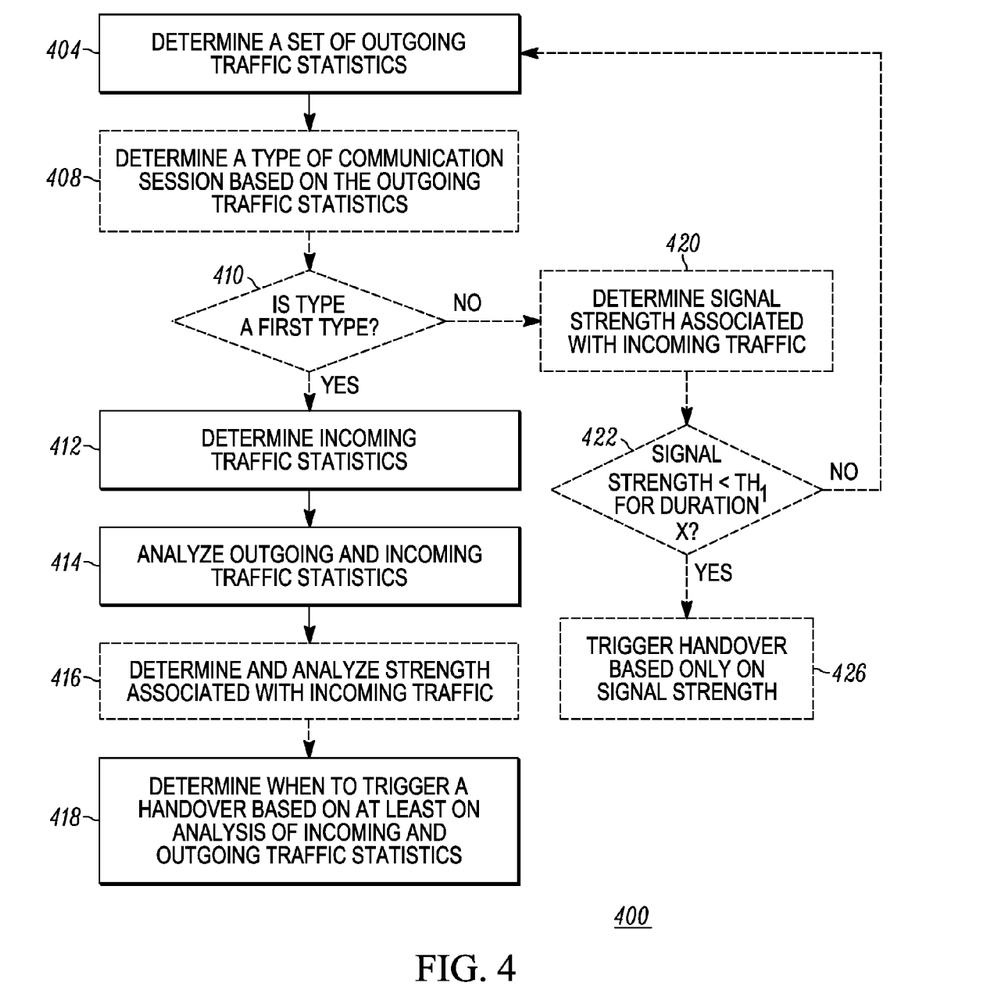
FIG. 4 is a flowchart illustrating a method of determining when to handover an active communication session from a first wireless access network to a second wireless access network in accordance with some embodiments.

We turn now to a detailed description of the functionality of the device 102, device components 200, and device protocols shown in FIGS. 1, 2, and 3, respectively, in accordance with the teachings herein and by reference to the remaining figures. FIG. 4 is a logical flow diagram illustrating a general method 400 performed by a device, such as the device 102, for determining when to handover an active communication session from a first wireless access network to a second wireless access network in accordance with some embodiments. In a particular embodiment, at least some portions of the method 400 and methods 500 and 600 illustrated by reference to FIGS. 5 and 6 can be performed by a traffic analysis module as described above. Moreover, in an embodiment, method 400 repeats periodically, for instance every ten seconds.

Turning now to the details of method 400, the wireless communication device 102 determines 404 a set of traffic statistics for outgoing traffic. As used herein traffic statistics means statistics or characteristics determined or calculated based on or from a particular traffic stream or flow itself or packets themselves over a given time. This is in contrast to measurable access network characteristics and/or to link characteristics such as signal strength, which refers to the magnitude of the electric field that carries the traffic or packets, which are not a characteristic of the traffic but of the access network or a physical link or connection within the access network that carries the traffic. Other measurable access network and/or link parameters that are not traffic statistics include, for example, network congestion, signal-to-noise ratio (SNR), etc. Outgoing traffic statistics are statistical characteristics determined from or based on outgoing traffic or packets. Incoming traffic statistics, discussed further below, are statistical characteristics determined from or based on incoming traffic or packets. For example, the incoming and outgoing traffic statistics can include statistics of one or more of packet rate; packet size; length of silence or burst periods of time; and frequency of silence or burst periods of time. Silence is an absence of traffic for a given time. A burst is a period of time where multiple packets of traffic are sent in a sequence.

In one particular embodiment, the traffic analysis module observes the outgoing data packets traversing the transport section 310 and determines 404 a set of outgoing traffic statistics in accordance with the present teachings. In a further embodiment, the traffic analysis module interfaces and communicates with the communication stack 314 to know which network, e.g., 104 or 110, is carrying the traffic during the active communication session.

In one embodiment, the traffic analysis module determines what traffic is ongoing within an active communication session by determining that one or more outgoing traffic statistics falls within a given range or meets or satisfies a given threshold for the outgoing traffic. For example, where the traffic is voice traffic generated by the voice application 302, the traffic analysis module determines when a voice call is ongoing by observing the statistical characteristics of the outgoing IP traffic. There is no need to perform deep-packet inspection, which may not even be feasible when, for example, the upper layers apply encryption to the voice traffic. For many voice applications, the voice traffic is characterized by outgoing traffic statistical limits of a fixed packet rate, e.g., one voice packet per 20 millisecond, and packet sizes that range between 120-230 bytes. The packet rate threshold or range and the packet size range is, in one embodiment, set based on the communication protocol used to prepare the traffic for transmission and can be stored in the device 102 as outgoing traffic statistical limits for comparing the outgoing traffic statistics. Where the traffic analysis module determines that the packet rate and/or packet size of the outgoing traffic meet these limitations, an ongoing voice call is detected 402 (408). A similar methodology can be used to detect an ongoing video session, for example, based on data rate (in this case frame rate) and frame size.

Even when Voice Activity Detection (VAD) is applied to outgoing packets, detecting the presence of voice traffic can be easily performed because within the talkburst (i.e., bursts of voice traffic) periods, the outgoing IP traffic exhibits certain rate and size characteristics, and the talkburst periods are interchanged with silent periods, which again have certain duration distribution. Moreover, when users are engaged in voice communication, they rarely execute other applications with a relatively high traffic rate, so the "interfering" traffic rate (i.e., the rate of non-voice traffic) will only be a small percentage of the voice traffic rate. Therefore, such "interfering" IP traffic is not expected to affect the ability of traffic analysis module to detect voice traffic.

In accordance with a general embodiment, the traffic analysis module derives 404 outgoing traffic statistical characteristics for instance statistics of the packet rate, packet size and/or burst/silent periods based on or from the detected outgoing traffic and derives 412 incoming traffic statistical characteristics for instance statistics of the packet rate, packet size and/or burst/silent periods based on or from the detected incoming traffic. The traffic analysis module then analyzes 414 the outgoing and incoming statistical characteristics or traffic statistics to determine 418 when to trigger a handover from the first, e.g., WLAN 104, access network to a second, e.g., cellular 110, access network. The determination 418 of when to handover is independent of: the voice application, e.g., Skype, Google Talk, IP Multimedia Subsystem/Session Initiation Protocol, or other application in use; the particular voice codec used; or the different transport schemes, e.g., User Datagram Protocol/Real-Time Transport Protocol encapsulation or TCP encapsulation applied by the different applications. This is because notwithstanding the above differences, the statistical characteristics of the generated traffic can be compared to well-known bounds.

In a further embodiment, the device 102 does not perform functions 412, 414, and 418 with all types of traffic but selectively performs these functions depending on the type of outgoing traffic detected. This is because long breaks in communication may not be as critical to a user for some applications such as the web browsing application 306. However, minimizing breaks in communication for some applications may be very important to a user's experience. For example, the device 102 determines 412 the set of incoming traffic statistics, analyzes 414 the incoming and outgoing traffic statistics, and determines 418 when to trigger the handover of the active communication session based on the analysis of the incoming and outgoing traffic statistics only when the type of communication session is a voice call or a video session.

In this particular embodiment, the traffic analysis module is further configured to determine 408 a type of active communication session based on the set of outgoing traffic statistics. Then, only when the traffic analysis module determines 410 that the type of the active communication session is a particular (first) type of communication session, does the traffic analysis module proceed to determine 412 the set of incoming traffic statistics, analyze 414 the incoming and outgoing traffic statistics, and determine 418 when to trigger the handover of the active communication session based on the analysis of the incoming and outgoing traffic statistics.

Otherwise, the traffic analysis module can determine when to trigger the handover based only on an analysis of signal strength and without the analysis of the incoming and outgoing traffic statistics, when the type of the active communication is determined 410 not to be the first type of communication session. More particularly, the device 102 measures 420, for instance using an OS utility and/or the wireless transceivers 202 hardware, the signal strength received by the first wireless transceiver (e.g. the WiFi transceiver). The device 102 compares 422 the measured signal strength to a signal strength threshold $TH_1$ that can be a value in decibels or dBm or a percentage of a highest possible signal strength. If the measured signal strength exceeds the signal strength threshold $TH_1$, the device 102 returns to determining 404 the set of outgoing traffic statistics. However, when the measured signal strength falls below the threshold $TH_1$ for some predefined time period X, such as 5 seconds, the device 102 triggers 426 the handover, e.g., from the WiFi network 104 to the cellular network 110, based only on the signal strength.

In yet another embodiment, where the device 102 proceeds to determine 412 incoming traffic statistics and analyze 414 the outgoing and incoming traffic statistic, the device 102 also determines and analyzes 416 the signal strength associated with the incoming signal. This can be done, for instance, in the manner explained above by reference to the similar function illustrated in block 420 of method 400. In this embodiment, the traffic analysis module determines 418 when to trigger the handover of the communication session from the first access network to the second access network based on both the analysis 414 of the incoming and outgoing traffic statistics and further based on an analysis 416 of the signal strength such as by comparing the signal strength to a signal strength threshold for some predefined time period X, which is further illustrated and explained below by reference to the method 500 of FIG. 5.

Figure 5:
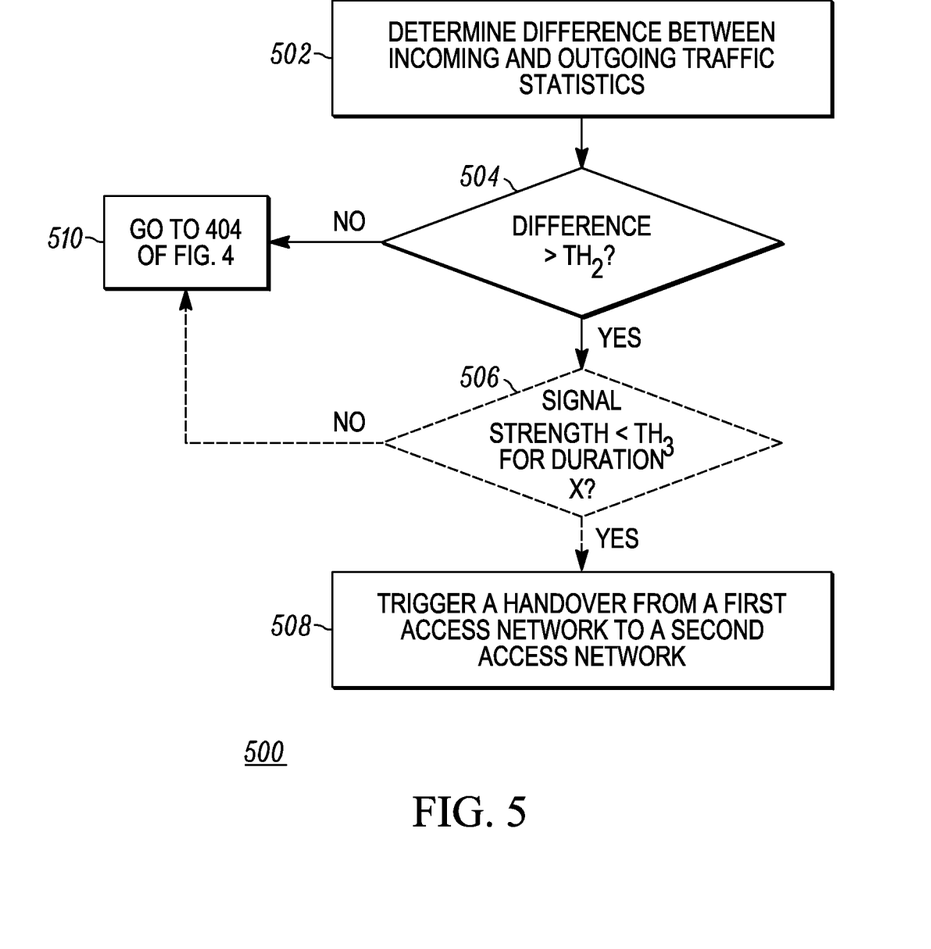
FIG. 5 is a flowchart illustrating a method of determining when to handover an active communication session from a first wireless access network to a second wireless access network in accordance with some embodiments.

More particularly, the analysis of the incoming and outgoing traffic statistics includes determining 502 a difference between incoming and outgoing traffic statistic, and comparing 504 the difference to a traffic difference threshold $TH_2$ to determine when to initiate the handover from the first access network to the second access network. Where only the difference between the incoming and outgoing traffic statistics is considered, the traffic analysis module triggers 508 the handover, when the difference satisfies the traffic difference threshold $TH_2$. In this embodiment, the difference satisfies $TH_2$ when the difference exceeds $TH_2$. When the difference fails to satisfy $TH_2$, the device 102 continues, at 510, to determine 404 the outgoing traffic statistics.

In an embodiment, the value of the threshold $TH_2$ used depends on the particular traffic statistics being monitored. Also, the traffic statistics difference is shown as being compared to one threshold to determine when to trigger the handover. However, in an embodiment, the difference could be compared to multiple thresholds, for instance one for each of several traffic statistics, to determine when to trigger the handover. For example, with multiple thresholds, the handover might be triggered based on particular ones or various combinations of the thresholds being satisfied or exceeded.

Figure 7:
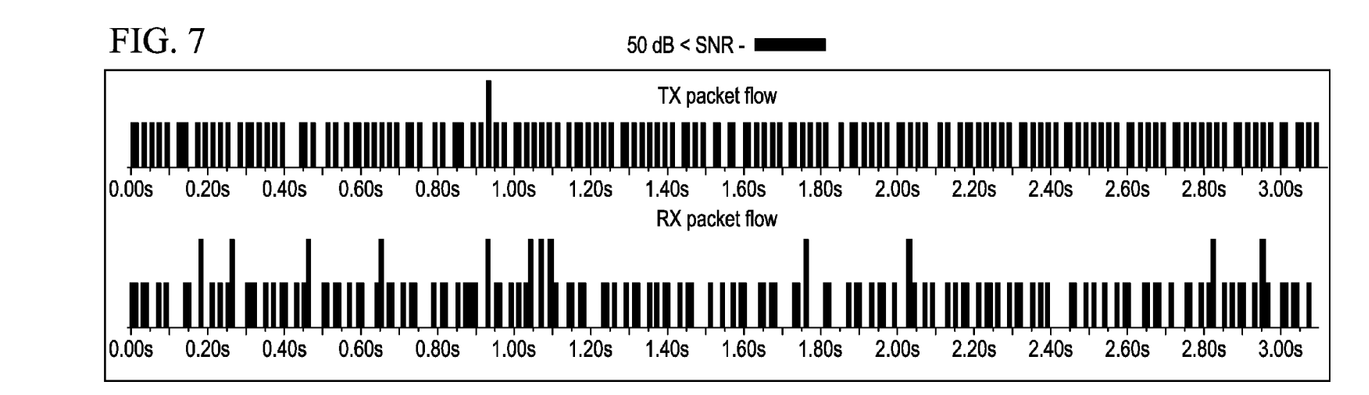
FIG. 7 is a signal and timing diagram illustrating differences between transmit and receive packet flows at a first distance from a wireless access point for determining when to handover communications in accordance with some embodiments.

Comparing the difference between the incoming and outgoing traffic statistics to multiple thresholds is illustrated by reference to timing diagrams shown in FIGS. 7-11. In one particular implementation, the traffic analysis module monitors the difference between the incoming and outgoing traffic statistics of packet rate, packet size, silence bursts, and packet bursts. For example, the outgoing packet rate may be determined to be 80 packets/sec, while the incoming packet rate may be determined to be 30 packets/sec. In this case, the difference between the incoming and outgoing statistics of packet rate is 50 packets/sec. The timing diagrams shown in FIGS. 7-11 further illustrate differences between transmit (TX) and receive (RX) packet flows at various distances between a wireless communication device and an infrastructure device within an access network. FIG. 7 illustrates the closest distance between the wireless communication device and the infrastructure device, with the distance between the two devices continuing to widen across FIGS. 8-11 and the farthest distance being reflected in FIG. 11. In this example implementation, the traffic is voice traffic communicated between the UE 102 and the access point (AP) 108 of the WiFi network 104.

As can be seen from FIGS. 7-11, the transmitted (TX) outgoing packet flows remain relatively consistent irrespective of the distance between the UE and the AP. Accordingly, the outgoing traffic statistics for the transmitted packet flow remains substantially constant and, therefore, serves as a good benchmark by which to compare the received (RX) incoming traffic statistics, which change with the change in the incoming packet flow based on the distance between the UE and the AP. More particularly, as can been seen in FIG. 7, when the UE is closest to the AP, incoming (RX) and outgoing (TX) traffic flows and their respective statistical characteristics are very similar. Therefore, none of the traffic difference thresholds, e.g., for packet rate, packet size, silence bursts period, and packet burst period, are exceeded. However, the differences in the statistical characteristics between the TX and RX packet flows increases as the distance between the UE and the AP increases, and, consequently, the voice quality degrades.

Figure 8:
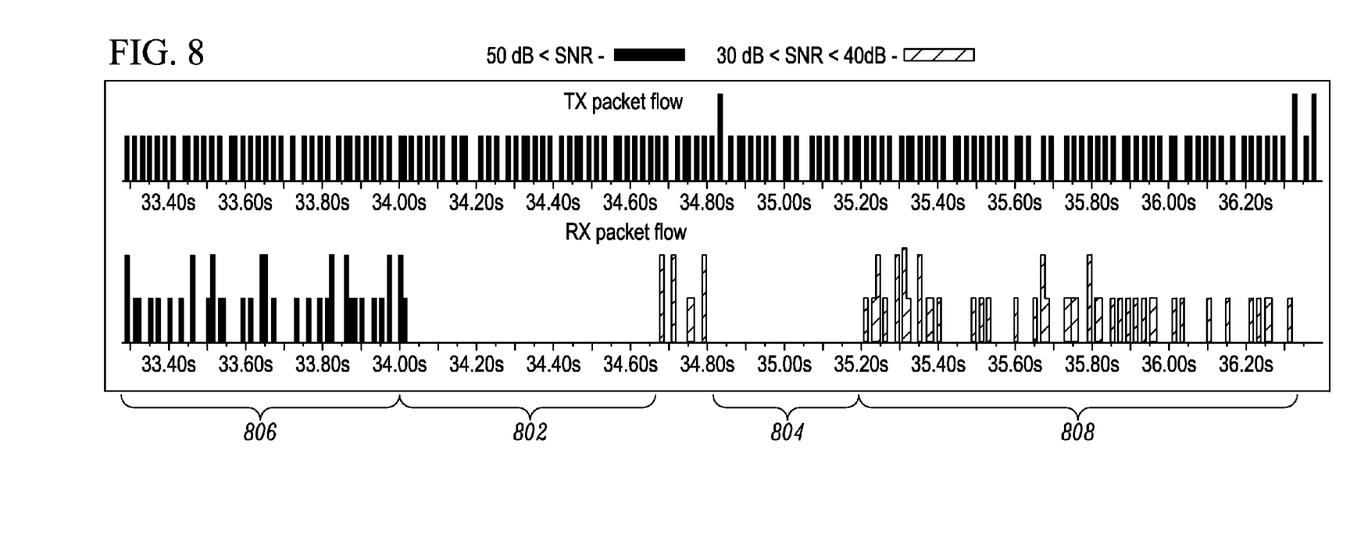
FIG. 8 is a signal and timing diagram illustrating differences between transmit and receive packet flows at a second distance from a wireless access point for determining when to handover communications in accordance with some embodiments.

FIG. 8 shows silence periods 802 and 804 in the RX packet flow. However, when determining the difference between the TX and RX packet flows based on silence periods to a relevant silence period threshold, the difference may exceed the threshold. However, this might not trigger a handover, especially when also considering other differences in statistical characteristics based on talkburst periods 806 and 808 in the RX packet flow, overall packet rate, and packet size, none of which may exceed their corresponding traffic difference thresholds. In contrast to FIG. 8, a handover might be triggered based on the differences between the TX and RX packet flows shown in FIG. 9, since the packet rate, talkburst period, and silence period are all very different from that illustrated by reference to FIG. 9.

Figure 9:
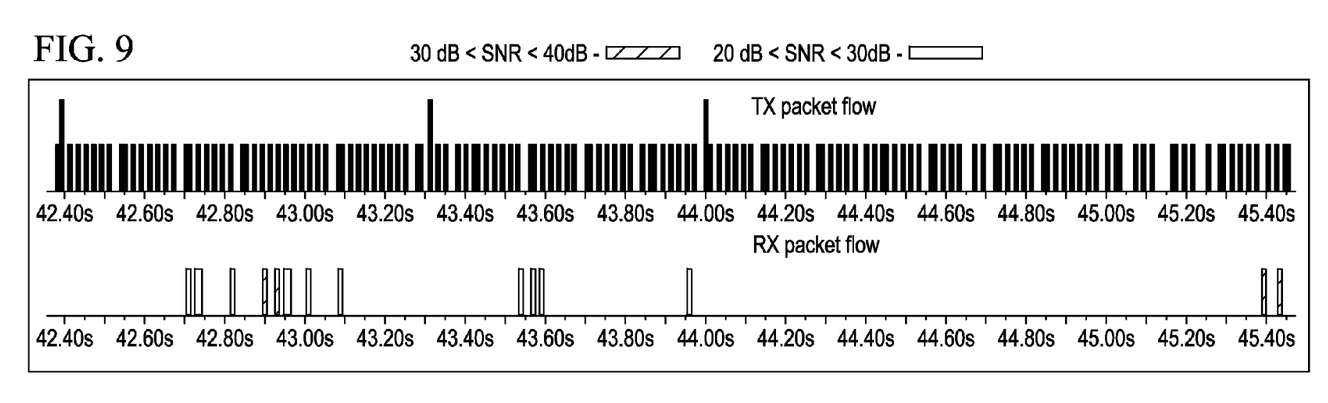
FIG. 9 is a signal and timing diagram illustrating differences between transmit and receive packet flows at a third distance from a wireless access point for determining when to handover communications in accordance with some embodiments.
Figure 10:
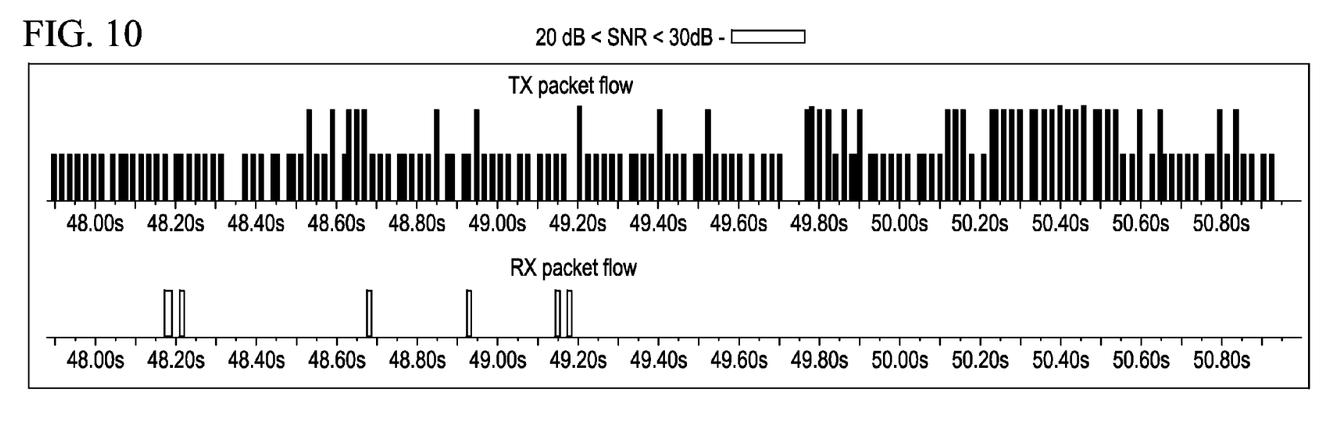
FIG. 10 is a signal and timing diagram illustrating differences between transmit and receive packet flows at a fourth distance from a wireless access point for determining when to handover communications in accordance with some embodiments.
Figure 11:
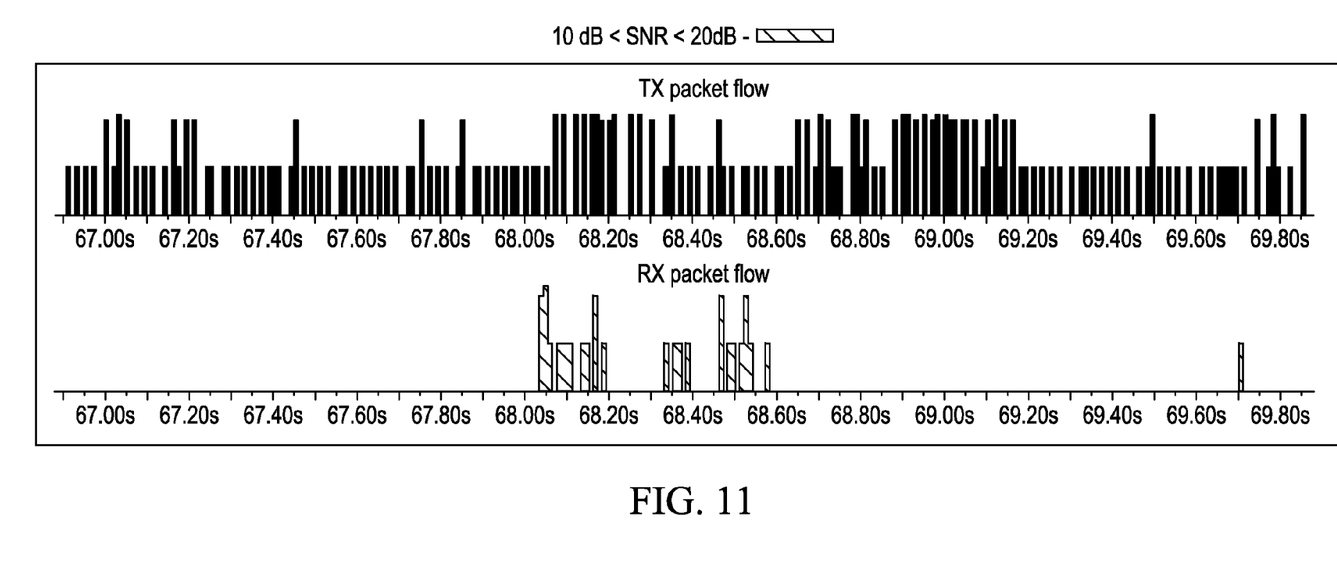
FIG. 11 is a signal and timing diagram illustrating differences between transmit and receive packet flows at a fifth distance from a wireless access point for determining when to handover communications in accordance with some embodiments.

When the condition illustrated in FIG. 9 or a similar condition as defined by the traffic difference threshold(s) is detected by the traffic analysis module, it can determine that voice quality over WiFi has become considerably bad and can instruct other modules in the UE to trigger handover to the cellular access network. FIG. 9 shows an example where the TX packet rate and the RX packet rate are very different. If this difference is higher that the threshold for packet rate, then handover will be triggered. This is also true for FIG. 10 and FIG. 11. The manner in which handover is triggered depends, at least in part, on the access networks involved in the handover. The method for triggering handover in accordance with the present teachings can produce a twofold benefit: (1) the voice session is handed over to the cellular access network when the voice quality starts to deteriorate and before it becomes unacceptable to the user; and (2) the voice break is considerably shorter than the observed near or above 10 second described earlier. Moreover, these benefits are application independent.

It is possible for the statistical characteristics of the incoming traffic to become very different from the corresponding characteristics of the outgoing traffic due to some traffic congestion in the core network (i.e. not due to bad received signal strength). To take this possibility into account, the traffic analysis module compares 506 the signal strength associated with the received incoming traffic to a signal strength threshold $TH_3$, and triggers 508 the handover when both the traffic difference threshold $TH_2$ and the signal strength threshold $TH_3$ are satisfied. In the embodiment shown, the traffic difference threshold $TH_2$ is satisfied when the difference between the incoming and outgoing traffic statistics exceeds the traffic difference threshold $TH_2$. The signal strength $TH_3$ threshold is satisfied when the measured signal strength falls below the first signal strength threshold $TH_3$ for a specific (predefined) time period X. When either of these thresholds fails to be satisfied, the device 102 returns to determine 404 the outgoing traffic statistics.

Turning again to FIG. 7-11, different hashing for the RX packet flows is shown to indicate the signal strength measured for and associated with the incoming traffic. Handover as a result of the RX traffic of FIG. 9 is supported by the measured signal strength or signal quality, which in this illustrative scenario is SNR, which is between 20 dB and 30 dB. In an embodiment, the signal strength threshold is set to 30 dB for triggering handover. In a further embodiment, the signal strength threshold $TH_3$ (shown in FIG. 5) used to determine when to handover the active communication session based on both the analysis of the incoming and outgoing traffic statistics and the signal strength is larger than the signal strength threshold $TH_1$ (shown in FIG. 4) used for determining when to perform a handover based only on signal strength. This is to enable a handover decision to be made faster for traffic generated by applications that are more sensitive to breaks in communication than for traffic generated by applications where the user experience is not as dependent on breaks in the communication such as with non-real time applications including, but not limited to, web browsing applications, downloading video from a server for later viewing, etc. For an example embodiment, $TH_1$ is set at 20 dB or even less, which would not trigger a handover until the RX packet flow and corresponding traffic characteristics reach a state like the one shown in FIG. 11 at an even farther distance between the UE and the AP and corresponding degradation in signal strength.

Figure 6:
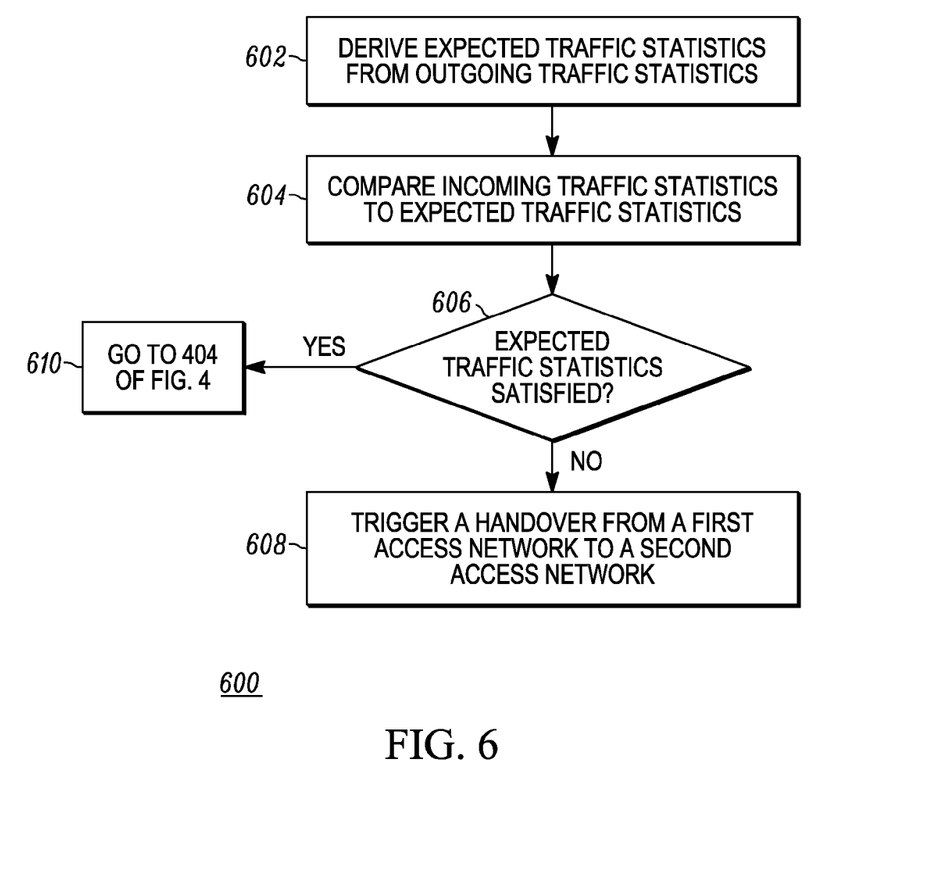
FIG. 6 is a flowchart illustrating a method of determining when to handover an active communication session from a first wireless access network to a second wireless access network in accordance with some embodiments.

Finally, FIG. 6 shows another embodiment of a method 600 for analyzing the incoming and outgoing traffic statistics to determine when to trigger a handover from a first access network to a second access network. In this embodiment, the traffic analysis module derives 602 an expected traffic statistic (expected statistic) from the outgoing traffic statistic. For example, a particular traffic statistic (e.g., the packet rate) can be scaled or a range defined based on the outgoing traffic statistic to derive the expected statistic. Accordingly, the expected statistic sets the boundaries to which the corresponding incoming traffic statistic is compared 604 to determine when to trigger 608 the handover. When the incoming traffic statistic satisfies the expected traffic statistic, for example when the incoming traffic statistics exceed 606 a threshold (that sets a lower bound for the traffic statistic) or fall within a range of the expected traffic statistic, the traffic analysis module, at 610, continues to determine 404 the outgoing traffic statistics. However, where the incoming traffic statistic fails to satisfy the expected traffic statistic, the device 102 triggers 608 the handover. In a further embodiment, signal strength is concurrently considered with comparing the incoming traffic to the expected statistic.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A wireless communication device configured to determine when to trigger a handover of a communication session from a first access network to a second access network, the wireless communication device comprising:
    a first wireless transceiver configured to transmit outgoing traffic and to receive incoming traffic communicated, using the first access network, during an active communication session;
    a traffic analysis module coupled to the first wireless transceiver and configured to:
    determine, for the active communication session, a set of outgoing traffic statistics for the outgoing traffic;
    determine, for the active communication session, a set of incoming traffic statistics for the incoming traffic;
    analyze the incoming and outgoing traffic statistics;
    determine when to trigger a handover of the active communication session from the first access network to the second access network based on the analysis of the incoming and outgoing traffic statistics;
    wherein the traffic analysis module is further configured to:
        analyze the incoming and outgoing traffic statistics by determining a different between the incoming and outgoing traffic statistics and comparing the different to a traffic difference threshold;
        determine a signal strength associated with the received traffic and compare the signal strength to a signal strength threshold;
        determine to trigger the handover when the difference between the incoming and outgoing traffic statistics exceeds the traffic different threshold and the signal strength falls below the signal strength threshold; and
    wherein analyzing the incoming and outgoing traffic statistics comprises comparing the incoming traffic statistics to expected traffic statistics, which are derived from the outgoing traffic statistics.

2. The wireless communication device of claim 1 further comprising a memory component configured with a protocol stack that comprises:
    an application layer that includes at least one application;
    a Transport Control Protocol/Internet Protocol stack in communication with the application layer;
    a communication stack that includes a link layer protocol and a physical layer protocol, wherein the communication stack is in communication with the Transport Control Protocol/Internet Protocol stack; and
    a traffic analysis layer having a traffic analysis protocol that is executable by the traffic analysis module to control functionality of the traffic analysis module, wherein the traffic analysis layer is one of:
    coupled to the Transport Control Protocol/Internet Protocol stack;
    included within the Transport Control Protocol/Internet Protocol stack or included within the communication stack.

3. The wireless communication device of claim 1 further comprising a second wireless transceiver coupled to the traffic analysis module, wherein the second wireless transceiver is configured to transmit outgoing traffic and to receive incoming traffic communicated using the second access network, wherein the first and second wireless transceivers are configured for alternate operation to support wireless communications over the first and second access networks.

4. The wireless communication device of claim 1, wherein the traffic analysis module is further configured to:
    determine a type of active communication session based on the set of outgoing traffic statistics; and
    only when the type of the active communication is a first type of communication session, proceed to determine the set of incoming traffic statistics, analyze the incoming and outgoing traffic statistics, and determine when to trigger the handover of the active communication session based on the analysis of the incoming and outgoing traffic statistics.

5. A method performed by a wireless communication device for determining when to trigger a handover of a communication session from a first access network to a second access network, the method comprising:
    determining, for an active communication session, a set of outgoing traffic statistics for outgoing traffic sent by the wireless communication device using the first access network;
    determining and analyzing a signal strength associated with the received incoming traffic;
    determining for the active communication session, a set of incoming traffic statistics for incoming traffic received by the wireless communication device using the first access network;
    analyzing the incoming and outgoing traffic statistics;
    determining when to trigger a handover of the active communication session from the first access network to the second access network based on the analysis of the incoming and outgoing traffic statistics and based on the analysis of the signal strength; and wherein the first signal strength threshold used to determine when to handover the active communication session based on both the analysis of the incoming and outgoing traffic statistics and the signal strength is larger than a second signal strength threshold used for determining when to perform a handover based only on signal strength.

6. The method of claim 5 further comprising determining to trigger the handover when both a traffic difference threshold and the first signal strength threshold are satisfied.

7. The method of claim 5 further comprising detecting a type of active communication session based on the set of outgoing traffic statistics.

8. The method of claim 7, wherein determining the set of incoming traffic statistics, analyzing the incoming and outgoing traffic statistics, and determining when to trigger the handover of the active communication session based on the analysis of the incoming and outgoing traffic statistics is performed only when the type of the active communication session is a first type of active communication session.

9. The method of claim 8, wherein the first type of communication session comprises at least one of a voice call or a video session.

10. The method of claim 5, where the sets of outgoing and incoming traffic statistics comprises at least one of:
packet rate;
packet size;
length of silence periods;
frequency of silent periods;
length of burst periods;
frequency of burst periods.

11. The method of claim 5, wherein analyzing the incoming and outgoing traffic statistics comprises comparing the incoming traffic statistics to expected traffic statistics, which are derived from the outgoing traffic statistics.

12. The method of claim 5, wherein determining when to trigger the handover of the active communication session from the first access network to the second access network comprises determining when to trigger the handover from a Wireless Local Area Network to a cellular network.

13. The method of claim 5, wherein analyzing the incoming and outgoing traffic statistics comprises determining a difference between the incoming and outgoing traffic statistics, and comparing the difference to a traffic difference threshold, and analyzing the signal strength comprises comparing the signal strength to a signal strength threshold, the method further comprising:
determining to trigger the handover when the difference between the incoming and outgoing traffic statistics exceeds the traffic difference threshold and the signal strength falls below the signal strength threshold.

14. The method of claim 5 further comprising:
determining a type of active communication session based on the set of outgoing traffic statistics, and only when the type of the active communication is a first type of communication session, determining the set of incoming traffic statistics, analyzing the incoming and outgoing traffic statistics, and determining when to trigger the handover of the active communication session based on the analysis of the incoming and outgoing traffic statistics and the analysis of the signal strength;
otherwise determining when to trigger the handover of the active communication based only on the analysis of the signal strength and without the analysis of the incoming and outgoing traffic statistics when the type of the active communication is not the first type of communication session.

15. A method performed by a wireless communication device for determining when to trigger a handover of a communication session from a first access network to a second access network, the method comprising:
determining, for an active communication session, a set of outgoing traffic statistics for outgoing traffic sent by the wireless communication device using the first access network;
determining and analyzing a signal strength associated with the received incoming traffic;
determining for the active communication session, a set of incoming traffic statistics for incoming traffic received by the wireless communication device using the first access network;
analyzing the incoming and outgoing traffic statistics;
determining when to trigger a handover of the active communication session from the first access network to the second access network based on the analysis of the incoming and outgoing traffic statistics and based on the analysis of the signal strength; and
detecting a type of active communication session based on the set of outgoing traffic statistics.

16. A method performed by a wireless communication device for determining when to trigger a handover of a communication session from a first access network to a second access network, the method comprising:
determining, for an active communication session, a set of outgoing traffic statistics for outgoing traffic sent by the wireless communication device using the first access network;
determining and analyzing a signal strength associated with the received incoming traffic;
determining for the active communication session, a set of incoming traffic statistics for incoming traffic received by the wireless communication device using the first access network;
analyzing the incoming and outgoing traffic statistics;
determining when to trigger a handover of the active communication session from the first access network to the second access network based on the analysis of the incoming and outgoing traffic statistics and based on the analysis of the signal strength; and
wherein analyzing the incoming and outgoing traffic statistics comprises comparing the incoming traffic statistics to expected traffic statistics, which are derived from the outgoing traffic statistics.

* * * * *